C. VOGT.
NEEDLE HOLDER FOR THE SOUND BOXES OF TALKING MACHINES.
APPLICATION FILED AUG. 24, 1905.

1,015,363.

Patented Jan. 23, 1912.
7 SHEETS—SHEET 1.

C. VOGT.
NEEDLE HOLDER FOR THE SOUND BOXES OF TALKING MACHINES.
APPLICATION FILED AUG. 24, 1905.

1,015,363.

Patented Jan. 23, 1912.
7 SHEETS—SHEET 2.

C. VOGT.
NEEDLE HOLDER FOR THE SOUND BOXES OF TALKING MACHINES.
APPLICATION FILED AUG. 24, 1905.

1,015,363.

Patented Jan. 23, 1912.
7 SHEETS—SHEET 3.

Fig. 10.

Witnesses
F. C. Battis
Alexander Park

Inventor
Clarence Vogt
by Horace Potter
Attorney

C. VOGT.
NEEDLE HOLDER FOR THE SOUND BOXES OF TALKING MACHINES.
APPLICATION FILED AUG. 24, 1905.

1,015,363.

Patented Jan. 23, 1912.

C. VOGT.
NEEDLE HOLDER FOR THE SOUND BOXES OF TALKING MACHINES.
APPLICATION FILED AUG. 24, 1905.

1,015,363.

Patented Jan. 23, 1912.

Witnesses
F. E. Barry
Alexander Punk

Inventor
Clarence Vogt
by Horace Pettit
Attorney.

C. VOGT.
NEEDLE HOLDER FOR THE SOUND BOXES OF TALKING MACHINES.
APPLICATION FILED AUG. 24, 1905.

1,015,363.

Patented Jan. 23, 1912.

Witnesses
F. C. Barry
Alexander Park

Inventor
Clarence Vogt
by Horace Pettit
Attorney

C. VOGT.
NEEDLE HOLDER FOR THE SOUND BOXES OF TALKING MACHINES.
APPLICATION FILED AUG. 24, 1905.

1,015,363.

Patented Jan. 23, 1912.

Witnesses
F. C. Barry
Alexander Park

Inventor
Clarence Vogt
by Horace Pettit
Attorney

UNITED STATES PATENT OFFICE.

CLARENCE VOGT, OF BERLIN, GERMANY, ASSIGNOR, BY MESNE ASSIGNMENTS, TO VICTOR TALKING MACHINE COMPANY, OF CAMDEN, NEW JERSEY, A CORPORATION OF NEW JERSEY.

NEEDLE-HOLDER FOR THE SOUND-BOXES OF TALKING-MACHINES.

1,015,363.     Specification of Letters Patent.     Patented Jan. 23, 1912.

Application filed August 24, 1905. Serial No. 275,516.

*To all whom it may concern:*

Be it known that I, CLARENCE VOGT, citizen of the United States of America, residing at Berlin, in the Empire of Germany, have invented certain new and useful Improvements Relating to Needle-Holders for the Sound-Boxes of Talking-Machines, of which the following is a specification.

This invention relates to needle-holders for the sound-boxes of talking machines, and more particularly to needle-holders or stylus bars of the kind in which the insertion and securing of the needle is effected without the employment of screws or similar fastening means. For this purpose, such needle-holders are provided with clamping means, in which the needle is held by friction so as to be capable of being freely changed, additional spring pressure being provided if required. The needle is secured in its correct position by the pressure of the sound box on the record and the clamping means are preferably oppositely-located in the bore of the needle-holder, so that the needle is grasped and held at the upper end by one and at the lower end by the other clamping means. It may be understood that the invention relates also to needle-holders having in the usual manner screws for fastening the needle, eventually in combination with clamping places.

An important feature of the present invention consists in that a lateral longitudinally-extending slot is provided in the needle-holder near the clamping means, through which slot the needle can be conveniently introduced into and removed from its operative position between the clamping means through the sides of the needle-holder, the said needle meanwhile moving parallel to its longitudinal direction. This lateral insertion of the needle presents the advantage that, for the insertion and replacement of the needle, a mechanical device can be arranged whereby the needles are fed, moving parallel to themselves, into the lateral slot in the needle-holder, in the contradistinction to the known needle-changing devices in which the needles are moved along in the direction of their axes. The lateral insertion of the needle further presents the possibility of arranging the mechanical needle-changing device independently of the sound-box and of its carrier-arm and of thereby relieving the sound-box of the weight of the needle-carrying device. The needle-holder can be provided, on the side opposite to the inlet slot, with an additional slot which serves for the feeding out of the needles. This preferably takes place in such a manner that the new-needle introduced laterally into the needle-holder automatically pushes out the already used needle still in the holder, at the other side.

A separate locking or holding device may, if desired be provided on the needle-holder, this device being constructed in such a manner that it holds the needle elastically in the normal position, but automatically opens by the lateral pressure when a needle is inserted and replaced. The locking or holding means for the needle when the needle-holder is made with two oppositely-arranged slots, is formed in such a manner that when inserting a new needle the previously used one is thrown out of the holder by a spring.

In the drawing, Fig. 24 is the corresponding plan and Fig. 25 a side elevation.

Figures 1, 2, 5, 6, 7, 8, 9:
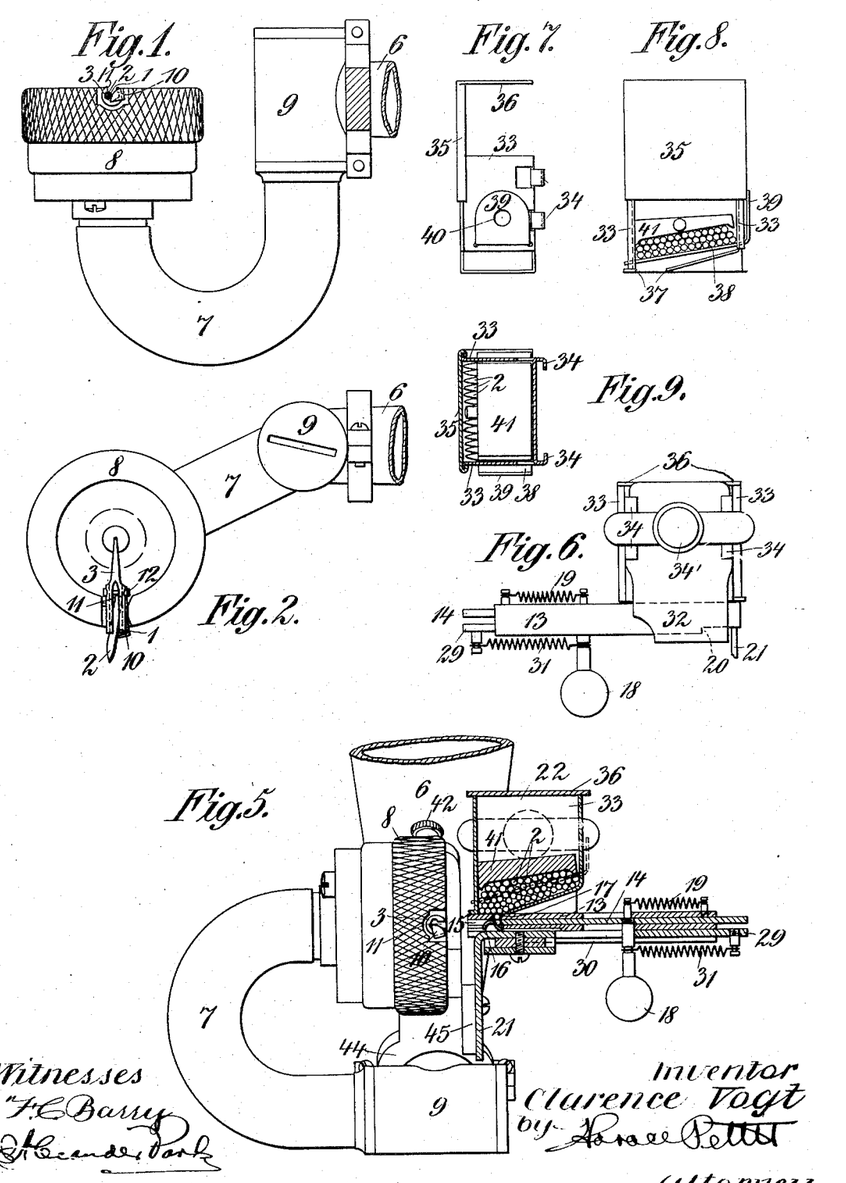
Figure 1 is an underside view of a sound-box which is pivotally attached to the sound-box arm and which has a needle-holder provided with clamping means and lateral slots, and which has a retaining spring for the needle.
Fig. 2 is a side elevation corresponding to Fig. 1.
Fig. 5 is an oblique elevation looking from the front with the sound-box swung up, and with the needle-magazine and the needle-changing device in section.
Fig. 6 is a rear elevation of the needle-changer.
Figs. 7 to 9 show an example of construction of the needle-magazine in different kinds of elevation, Fig. 7 being a side elevation with the front wall somewhat drawn up, Fig. 8 a front elevation, and Fig. 9 a horizontal section of Fig. 7.

In the form of construction shown in Fig. 1, the needle 2 is in the bore 1 of the needle-holder 3. The bore 1 is not round in cross-section but is enlarged in the direction of the sound waves. The bore 1 is preferably bounded by inclined surfaces, between which the needle 2 can rest firmly. The clamping places can also form curved surfaces, so that the bore 1 has a substantially elliptical cross-section. The force required for the clamping of the needle is produced by the friction of the needle on the record 4 in the rotation of the latter in the direction of the arrow 5 (see Fig. 3) and by the working pressure, with which the sound-box is pressed against the record.

The sound-box 8 is arranged in a known manner on the hollow arm 6 by means of a U-shaped connecting-piece 7 and a pivotal joint 9, so as to be capable of being moved up and down and so that the weight of the sound-box 8 produces the downwardly directed working pressure. Since the needle 2 rests obliquely on the record 4, the reactive force acts obliquely on the point of the needle 2.

The needle 2 can be introduced by hand into the bore 1 and be held fast until the sound-box is depressed to bring the needle 2 on to the record 4. After the depression of the sound-box, the needle can be released since the clamping of the needle is caused by the supporting thereof on the record. The needle 2 can also be held in the bore by means of a spring 10 (Fig. 1) until the said needle is placed on the record. Instead of the spring 10, any other well known means may be employed to prevent falling out of the needle before it is clamped.

In the form of construction shown in Figs. 1 and 2, the needle-holder 3 is provided on one side with a longitudinal slot 11 for the lateral introduction of the needle. The needle 2 is here inserted parallel to its longitudinal axis into the bore 1 between the clamping places of the needle-holder 3. From Fig. 2 it can be seen that the needle lies in the clamping places of the needle holder, bounding the longitudinal slot 11 in such a manner that it cannot fall out sidewise. The spring 10, which prevents the falling out of the needle in the direction of its axis, also prevents it from falling out laterally since it presses the needle against the clamping surfaces bounding the slot 11. The small bolt 12 (Fig. 2) bears the spring 10, and simultaneously serves as an abutment for the upper end of the needle. The bore for the bolt 12 is of importance in the formation of the bore for the needle, since the former limits the axial bore 1 which receives the needle 2. The needle 2 can be inserted by hand through the lateral slot 11. The insertion of the needle from the side is considerably more convenient than in the axial direction. It permits, in a practical and convenient manner, the insertion of the needles 2 by means of a mechanical device. For this purpose, in the device for changing the needles, the movable guide 13 for the slider 14 is provided with a longitudinal slot 15, in which a needle 2 can move transversely to the longitudinal direction of the slide. The longitudinal slot 15 is so arranged that it registers exactly with the slot 11 in the needle-holder 3, when the guide 13 is pushed up thereto. The slide 14 likewise moves in the slot 15 of the guide 13. It serves for feeding the needle lying in the guide 13 to the lateral slot 11 in the needle-holder 3. The slot 15 in the guide 13 is normally closed by a detent spring 16 in such a manner that the needle 2 falling through a slot 17 in the guide 13 out of a needle-magazine 22 into the longitudinal slot 15 is held against the front surface of the slide 14. By this means, further needles 2 are prevented from falling out of the magazine 22 through the slot 17 into the guide. A second needle 2 fills up the slot 17; it takes the place of the first needle after the latter has been inserted into the needle-holder 3, Fig. 5. A handle 18 is fixed in the slide 14. In the motion of the slide 14, the handle 18 takes with it the guide 13 by means of the tension of a spring 19 mounted on the guide, until the stop 20 thereof abuts against the frame 21 of the slide-device and of the needle magazine 22. Instead of the fixed stop 20, a stop 24 which is adjustable as desired by means of a screw 23 or the like, can be employed. This adjustable stop is formed by the head 24 of the screw 23 for example. The screw-head 24 abuts against the end 25 of the base-frame 29 as soon as the movable guide 13 has bridged over the space between the needle-changer and the needle-holder. A set-screw 27 in the bearing standard 28 of the screw 23 serves to secure it in position after it has been adjusted. The guide 13 is guided on a base-plate 29 by means of the overlapping pieces 30. A spring 31, which engages with the handle 18 and the base-plate 29, returns the slide 14 and the guide 13 to their initial positions, acting in conjunction with the spring 19. On the side of the base-plate 29 is mounted a vertically arranged plate 32 which bears the magazine 22. This consists of a sheet-metal frame 33 with flanges 34, which grasp the vertical plate 32. A fastening device 34 serves for securing the magazine 22 to the plate 32. The front wall 35 of the magazine, which is fixed to the cover 36, is detachably connnected to the frame 33, so that the magazine 22 can be conveniently filled with needles when its outlet opening 37 is closed by a sliding shutter 38. The latter is provided at its front end-piece 39 with a hole 40 which, by the application of a lead seal, serves for protecting the filled magazine from being opened by unauthorized persons. A weight 41 rests loosely in the magazine 22 and presses on the needles 2 in the magazine and the needles 2 are fed thereby with certainty to the outlet-opening 37. The magazine 22 presents the advantage that it can also serve as a storage-receptacle for the needles 2 instead of the needle-case otherwise usually employed.

Figures 3, 4:
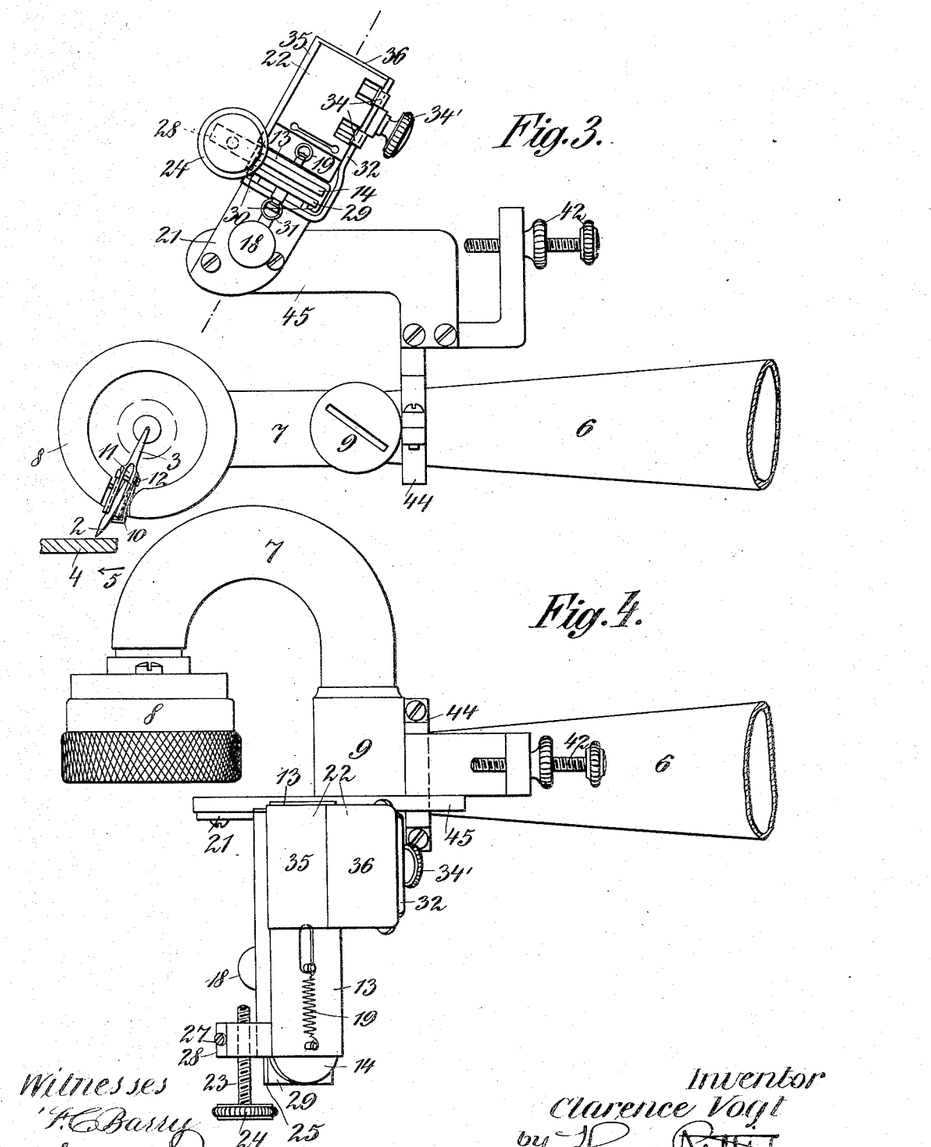
Fig. 3 is a side elevation of a sound-box and needle-holder with a lateral slot and spring, in combination with a device whereby the needles are fed out of a needle-magazine to the lateral slot of the needle-holder.
Fig. 4 is a plan of this device for changing the needles, with the sound-box depressed.

An adjustable stop for the sound-box 8 is fixed on the sound-box-arm as shown in Fig. 4; this stop consists of a screw 42 with head and locknut. By means of this stop 42, the position of the swung up sound-box can be adjusted in such a manner that the slot 15 of the guide 13 and the longitudinal slot 11 of the needle-holder 3 can register exactly with each other.

Figure 10:
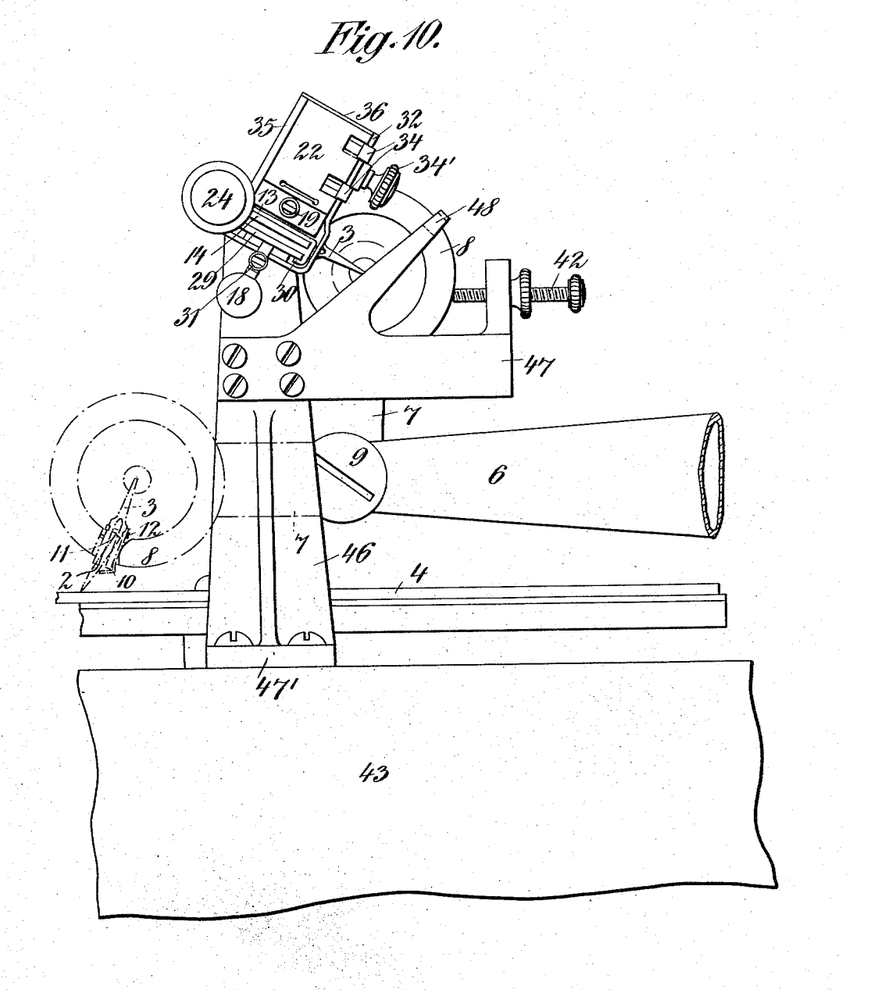
Fig. 10 is a partial side elevation of a talking machine looking in the direction of the arrow A of Fig. 11.
Figure 11:
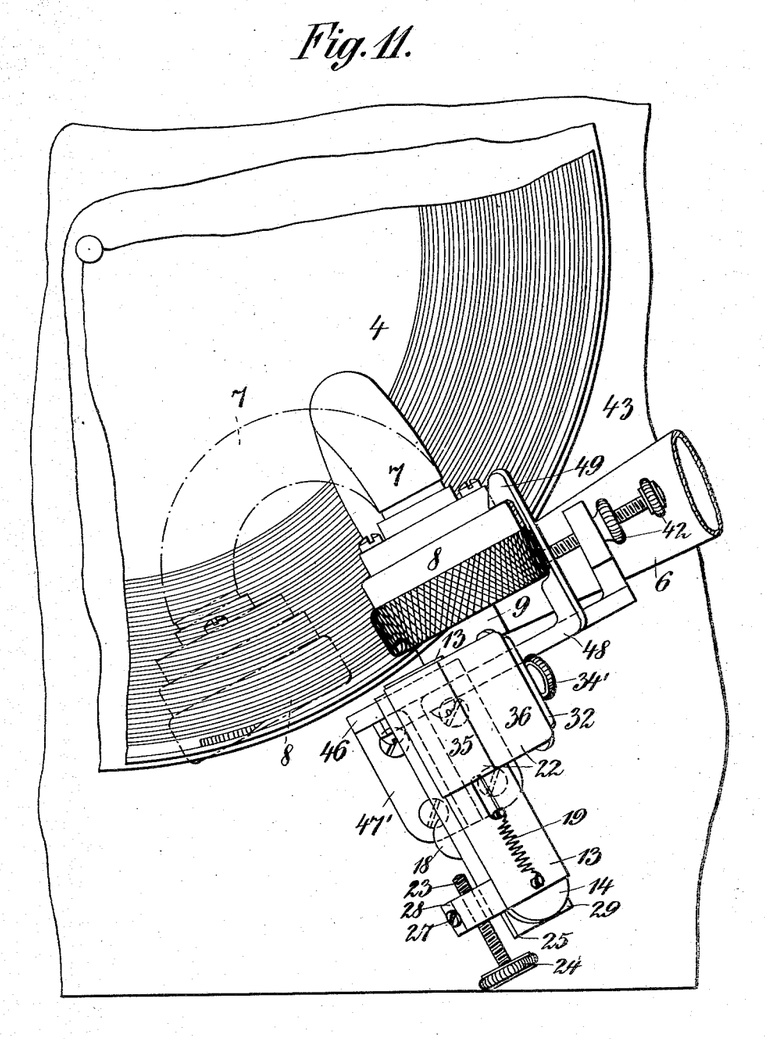
Fig. 11 is the plan corresponding to Fig. 10.

An advantage of the transverse insertion of the needles consists in that both the needle-changing device and also the magazine and adjustable stop 42 can be mounted on the box 43 of the talking machine (see Figs. 10 and 11) or on the sound-box-arm 6 (see Figs. 3 and 4) and thus do not load the sound-box 8.

In the form of construction shown in Figs. 3 and 4, a carrier-plate 45 is secured to the arm 6 by means of a strap 44. On the carrier plate 45, in addition to the needle-changer 13, 14 and the magazine 22, there is mounted the adjustable stop 42. In the form of construction shown in Figs. 10 and 11, the needle-changer, magazine and adjustable stop are fixed to a stand 46 which, by means of a base-plate 47', rests on the box 43 of the talking machine. The stand 46 directly supports the base-plate 29 of the needle-changer. On the stand 46 is fixed an arm 47 which, in addition to the adjustable stop 42, also bears a holding device 48 for the folded up sound-box 8. This holding device engages around the sound-box 8 (see Fig. 11) and holds it fast by means of the spring-catch 49, so that it cannot be bent by the lateral pressure in the introduction of a new needle.

The needle-changer, in the form of construction shown in Figs. 3 to 11, is operated by actuating the handle 18 after the sound-box 8 has been placed against the stop 42 and the used needle 2 has been ejected, by pressing it with the finger to one side, out of the slot 11 in the holder.

Figure 12:
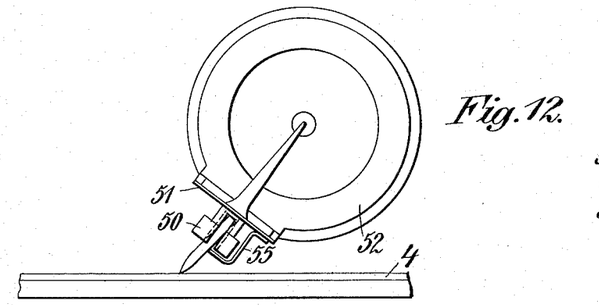
Fig. 12 shows a sound-box with a needle-holder having two slots and an inserted needle in the operative position.
Figures 13, 14, 15, 18, 19:
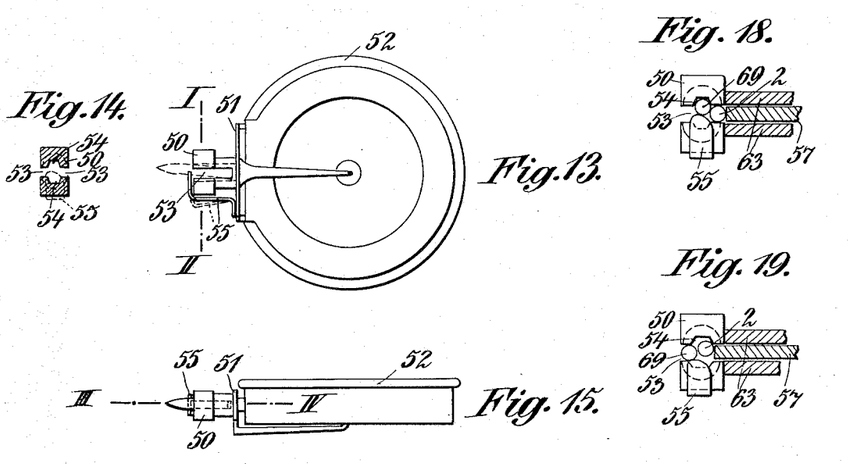
Fig. 13 is an elevation of the sound-box looking toward the needle-holder.
Fig. 14 is a transverse section on the line I—II, Fig. 13.
Fig. 15 is a plan corresponding to Fig. 13.
Figs. 17–20 show diagrammatically and to an enlarged scale, how a new needle is inserted into the needle-holder and the previously used needle removed.
Figure 16:
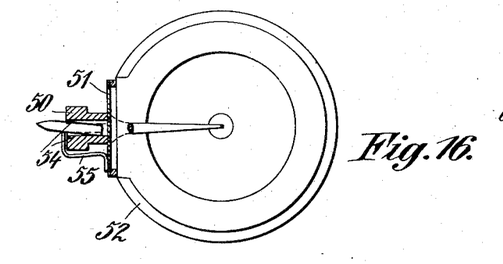
Fig. 16 shows the needle-holder in section and similar elevation to Fig. 13.

In the form of construction shown in Fig. 12, the needle-holder 50 is movably attached to the sound-box 51 by means of the flexible strip 52. The slot 53 for the introduction of the needles is extended through the whole needle-holder. In the slot are the grooves 54 for clamping the needles, while a spring 55 is arranged in such a manner that the needle in the slot 53 is pressed into a clamping groove 54. For this purpose, the spring 55 is rounded at the end turned toward the slot 53 so that the introduction of a new needle on one side of the slot 53 is facilitated and at the same time the ejection of the old needle on the other side of the slot 53 by spring pressure is permitted. As can be seen from Fig. 12, the needle is held obliquely in the clamping grooves 54 in the slot 53, in the operative position of the sound-box, by the weight of the latter, in which position the spring 55 is pressed back by the needle.

When the sound-box with the improved needle-holder is combined with a needle-changer 56, as shown in Figs. 21 to 25, the slide 57 of the needle-changer, which effects the introduction of the new and the changing of the old needle, must be so guided in the needle-changer 56 by means of the pin 58 and its forward motion must be limited in such a manner that the newly inserted needle is not pressed out beyond the correct normal position on the holder. On the slide 57, or on the pin 58, is mounted a handle 59 which for the purpose of moving the slide 57, is operated by hand, or, in automatic talking machines, by an arm moved by the driving gear. Spiral springs 60 and 61 connected to the pin 58 tend to hold the slide always in the position shown in Fig. 21. On the frame of the needle-changer 56 is detachably arranged the needle-magazine 62 with the needles 2. The guide 63, which is capable of being moved on the needle-changer frame and the slit 64 of which receives the needles 2 from the magazine 62 and holds them ready for the slide 57, by reason of the action of the spring 60, is carried along by the pin 58 of the slide 57, which pin is guided in the longitudinal slot 65 of the guide 63, until its adjustable stop-screw 66 abuts against the frame of the needle-changer and prevents further motion. This takes place when the guide 63 is brought up to the needle-holder 50 and the insertion of the needle by the slide 57 is to begin. The said slide is limited in its forward motion in that the pin 58 finally abuts against one end edge of the slot 65, so that the new needle cannot be pushed out beyond its normal position in the holder. The rearward motion of the slide 57 and of the guide 63 is effected, after the insertion of the new and the ejection of the old needle, by the spiral springs 60 and 61.

The sound-box 52, in the form of construction shown in Figs. 12 to 25, is also movably connected by the bent sound-box-arm 7 to the joint-piece 9 of the arm 6. A carrier-arm 67 secured to the arm 6 bears both the needle-changer 56 and also the adjustable stop 68, against which the sound-box 52 can rest when in the position in which it is raised from the plate 4 (see Fig. 25).

Figure 17:
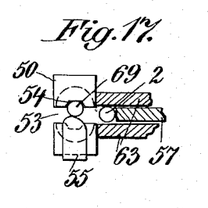
Figure 20:
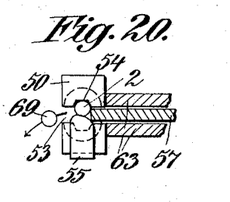
Figure 21:
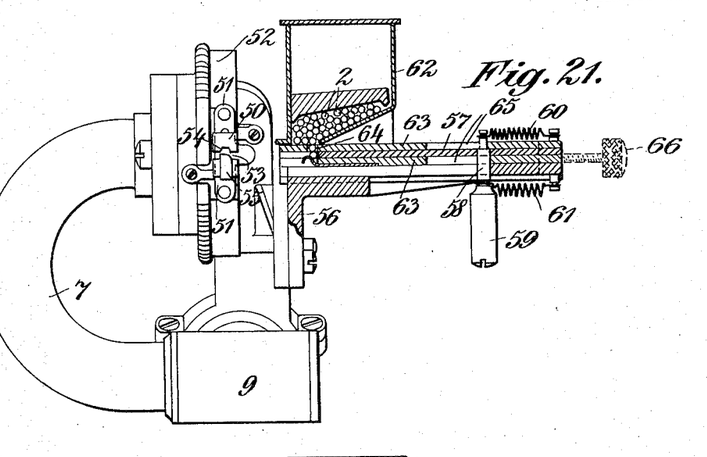
Figs. 21–23 are views of the needle-holder with two slots, in combination with a needle-changer in different operative positions of the latter.
Figures 22, 23:
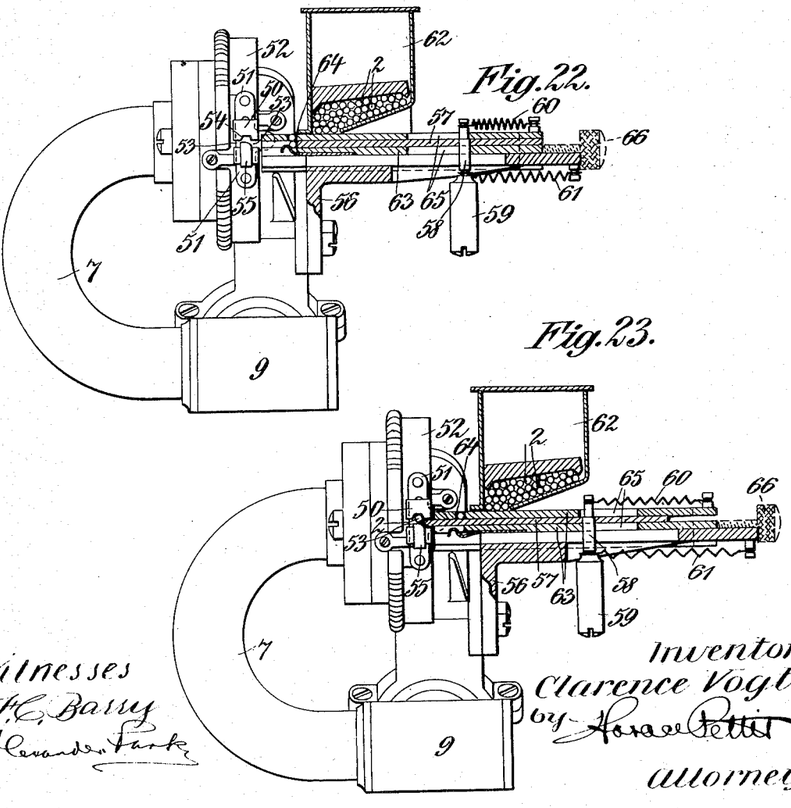
Figures 24, 25:
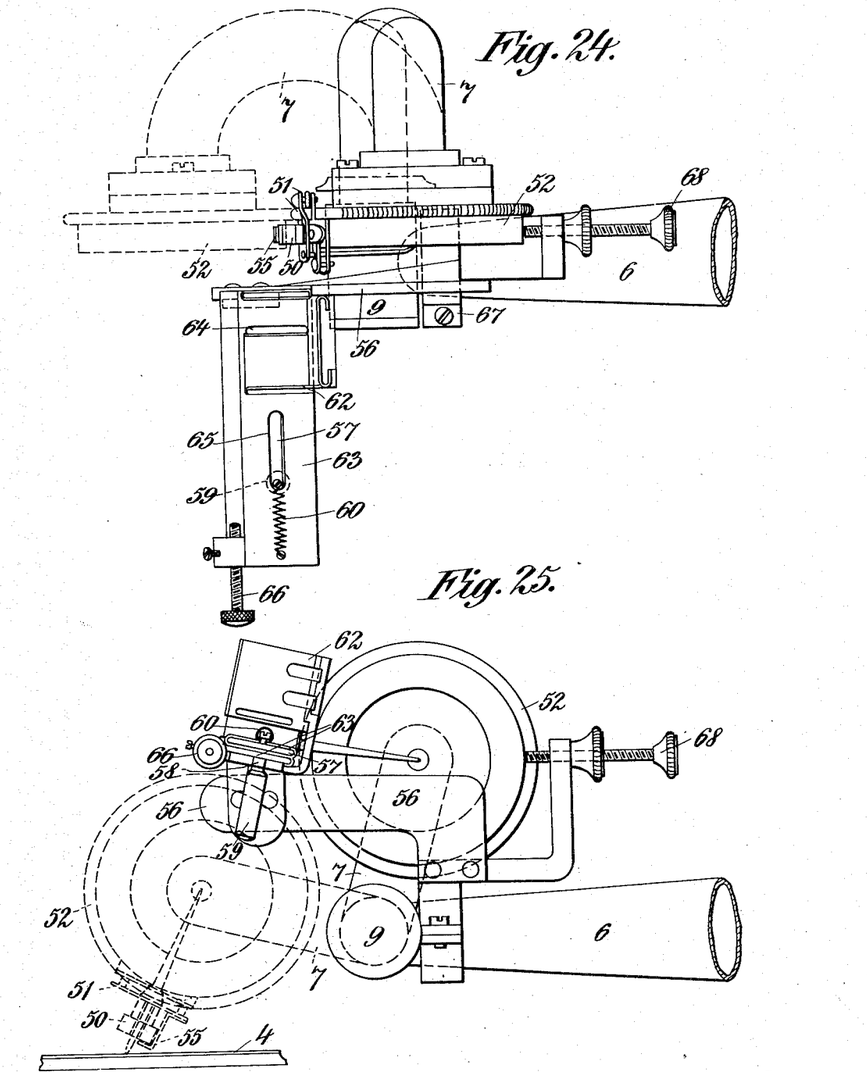

The various positions of the needles in the insertion and changing thereof by means of the slide 57 are given in Figs. 17 to 20. In Fig. 17, a new needle 2 is in the guide 63 of the needle-changer 56 on the way to the needle holder 50, while the previously used needle 69 is still in the slot 53, i. e., in the clamping grooves 54. The positions of the slide 57 of the guide 63 and of the needles 2 correspond substantially to those shown in Fig. 22. The guide 63 is stopped in its further motion by the striking of the screw 66 against the frame of the needle changer. In the position shown in Fig. 18, the slide 57 is pushed farther forward and the needle 2 has entered into the slot 53 in such a manner that it touches the old needle 69; the movable guide 63 is held fast as shown in Figs. 17 and 22. If now, according to Fig. 19, the forward motion of the slide 57 is continued, the fresh needle 2 forces the needle 69 out of the clamping grooves 54 at the same time overcoming the pressure of the spring 55. As shown in Fig. 20, the new needle 2 then enters the place of the old needle 69 and the spring 55 flying back into the position shown in Fig. 17 causes the used needle 69 to be ejected from the slot 53 with a certain amount of force. Thereupon the return of the slide 57 and of the guide 63 takes place by means of the springs 60, 61. The needle-holder provided with two slots is of special importance for automatic talking machines with automatic mechanism for changing the plates. For talking machines of this kind, it is necessary that the insertion and ejection of the needles shall take place automatically. It is important that the needle shall be capable of being easily changed. The falling out of the needle can also be temporarily prevented by a recess turned in the needle 2 or by thickening the end of the needle.

The construction of the needle-changer in its details can be varied as desired, similarly that of the needle-magazine. It is however always of importance that the outlet-openings of the magazine, the transverse slot and the longitudinal slot of the slider-guide shall be so arranged that the needle is moved parallel to its longitudinal direction as it is fed to the needle-holder.

The needle-holder can be mounted in any desired manner, either as in Figs. 1 and 2, or as in Fig. 12. It is however important that the needle-holder shall always be provided with a lateral longitudinal slot for the lateral insertion of the needle.

The invention is not limited to the combination of the needle-changer with a peculiar construction of needle-holder, since it is possible to provide a needle-holder having any other means therein for securing the needle.

Having described my invention, what I claim and desire to secure by Letters Patent is:—

1. The combination with a sound box, of a talking machine, of a stylus bar provided with a socket for supporting a needle therein, one wall of said socket being provided with a slot of less width than the corresponding width of the socket and normally wide enough to permit the insertion and removal of a needle laterally therethrough.

2. The combination with the sound-box of a talking machine, of a needle-holder having oppositely-arranged clamping means for securing the needle and a lateral slot for the lateral insertion of the needle between said clamping means, and a spring arranged on the needle-holder near the slot for pressing the needle into the clamping means.

3. A sound box for talking machines comprising a stylus bar having a socket for holding a stylus and a slot of less width than said socket and extending longitudinally thereof for permitting the lateral insertion and removal of a stylus, and yielding means arranged to engage said stylus outside of said socket for holding said stylus in operative position.

4. A sound box for talking machines, comprising a needle holder socketed at one end, a spring located exteriorly of the socket and acting in a line normal thereto, and a needle movable laterally into and out of the said socket in opposition to the said spring.

5. A sound box for talking machines, comprising a needle holder socketed at one end, a spring located outside of said socket and extending across the open end thereof, and a needle movable laterally into and out of said socket in opposition to the said spring.

6. A sound box for talking machines, comprising a socketed needle holder, a spring arranged on the exterior of the socket and controlling the entrance to the same, and a stylus movable laterally into and out of the said socket in opposition to the said spring.

7. A stylus bar provided with oppositely disposed walls for holding a stylus, and means external to said bar arranged to hold a stylus obliquely in position between and against said walls.

8. The combination with a stylus bar having a stylus socket, of a stylus laterally movable with respect to said bar into said socket, and yielding means to hold said stylus with its longitudinal axis oblique to the longitudinal axis of said socket.

9. The combination with a stylus bar, having a stylus socket polygonal in a section perpendicular to the longitudinal axis of the socket, and a slot for the lateral insertion of a stylus, of a stylus insertible laterally into said socket through said slot and movable laterally in said socket with respect to said bar, and means arranged to hold said stylus with its longitudinal axis oblique to the longitudinal axis of said socket.

10. The combination with a stylus bar having a stylus socket and a lateral slot for the lateral insertion of a stylus into said socket, of a spring secured to said bar and normally overlapping the end of said socket and adapted to engage a stylus to hold the stylus in position.

11. In a talking machine the combination with a swinging sound box, of needle changing mechanism for said sound box for automatically inserting a needle laterally into said sound box and for simultaneously ejecting one therefrom.

12. In a talking machine, the combination with a needle holder, of means for inserting a needle laterally into said holder.

13. The combination with a sound box of a talking machine, of a needle holder having means for permitting the lateral insertion and removal of a needle, and means separated from said sound box for supporting a plurality of needles near said needle holder, and arranged to insert and remove needles respectively into and from said holder.

14. The combination with the sound-box of a talking machine, of a needle-holder having a lateral slot and clamping means, and a device for inserting a needle laterally into said slot in a direction at right angles to the longitudinal axis of the needle.

15. The combination with the sound-box of a talking machine, of a needle-holder having a lateral slot for the lateral insertion of the needle, oppositely arranged clamping means in said needle-holder, means for retaining said needle in said holder, a needle-receptacle, and a slide-device for moving the needle at right angles to its longitudinal axis out of the needle-receptacle into the said slot.

16. The combination with the sound-box of a talking machine, of a needle-holder having a lateral slot for the lateral insertion of the needle, oppositely-arranged clamping means in said needle-holder, a spring for holding a needle in said clamping means, a needle-receptacle, a movable guide and a slide in said guide for moving said needle at right angles to its longitudinal axis into said slot.

17. The combination with the sound-box of a talking machine, of a needle-holder having oppositely-arranged clamping means and a lateral slot between said clamping means, a spring for holding a needle in said clamping means, a needle-receptacle a movable guide, a slide sliding in said guide and moving the needle in a direction at right angles to its longitudinal axis into the lateral slot in said needle-holder, and means for adjusting the guide to the slot in the needle-holder before the slide moves the needle forward.

18. The combination with the sound-box of a talking machine, of a needle-holder having a lateral slot and oppositely-arranged clamping means, a spring for retaining a needle in said clamping means, a needle-receptacle, a movable guide, a slide in said guide for moving a needle at right angles to its longitudinal axis into the lateral slot in said needle-holder, means for moving said guide and said slide, a frame supporting said guide and said slide, and a stop for coacting with said frame to limit the travel of said guide.

19. The combination with the sound-box of a talking machine, of a needle-holder having a lateral slot and oppositely-arranged clamping surfaces, a spring for retaining a needle in said clamping means, a movable guide, a slide in said guide for moving a needle at right angles to its longitudinal axis into the lateral slot in said needle-holder, a frame supporting said guide and said slide, means for moving said guide and said slide, and an adjustable set-screw for coacting with said frame to limit the travel of said guide.

20. The combination with the sound-box of a talking machine, of a needle-holder having a lateral slot and oppositely arranged clamping surfaces, a spring for retaining a needle in said clamping means, a movable guide, a slide in said guide for moving a needle at right angles to its longitudinal axis into the lateral slot in said needle-holder, means for moving said guide, in advance of said slide, and means arranged therein for retaining a needle in said guide.

21. The combination with the sound box of a talking machine, of a needle-holder having a lateral slot and clamping means, a pivotal arm supporting said sound-box, a needle-changing device, and an arm secured to said first-named arm and independent of said sound-box for supporting said needle-changing device.

22. The combination with the sound box of a talking machine, of a needle-holder having a lateral slot and clamping means, a pivotal arm supporting said sound-box so as to enable it to swing up and down, a needle-changing device, and an independent support for said needle-changing device arranged in such a position that the outlet of the needle-changing device registers with the lateral slot in the needle-holder when the sound-box is swung up.

23. The combination with the sound-box of a talking machine, of a needle-holder having a lateral slot and clamping means, and means mounted on the talking machine for ejecting a used needle through the said lateral slot.

24. A needle-holder for the sound-box of a talking machine, said needle-holder having two oppositely-arranged clamping surfaces for securing the needle, two oppositely-arranged longitudinal slots for the simultaneous insertion and removal of needles moving at right angles to their longitudinal axes, and a spring which holds the needle in its normal position and is rounded at the end opposite the opening of the needle-holder so as to facilitate the ejection of the used needle.

25. A needle-holder for the sound-box of a talking machine, said needle-holder having oppositely-arranged clamping surfaces for holding the needle and two oppositely-arranged longitudinal slots for the simultaneous lateral insertion and removal of needles, in combination with a needle-changing device comprising a needle-receptacle, a guide, a slide, and means for limiting the forward travel of said slide.

26. A needle-holder for the sound-box of a talking machine, said needle-holder having clamping means for holding the needle and a longitudinal slot for the lateral insertion of the needle, in combination with a needle-changing device having a needle-receptacle detachably secured thereto.

27. A sound-box for talking machines, comprising a needle-holder having means for securing a needle therein, in combination with a needle magazine, and means for feeding a needle from said magazine and inserting it laterally into said holder.

28. A sound-box for talking machines, comprising a needle-holder having means for securing a needle therein, in combination with a needle magazine, and means for removing a needle laterally from said holder and replacing the same by a needle from said magazine.

29. In a talking machine the combination with a laterally swinging arm, of a sound box supported thereby and a stylus bar provided with a needle-holder, a magazine for new needles detached from said sound box, and means to eject a worn needle from said needle holder and to replace it with a new needle from said receptacle.

30. The combination with a stylus bar having means for holding a stylus in position, of a slider for inserting the stylus laterally into said position.

31. The combination with a stylus bar having means for holding a stylus in position, of a movable guide for a stylus, and means movable with respect to said guide for inserting a stylus laterally through said guide and into position to be held by said stylus bar.

32. The combination with a stylus bar having means for holding a stylus, of a movable guide, a slide carried by said guide and movable with respect thereto, and means for moving the guide toward the stylus bar and then moving the slide with respect to the guide to insert a needle into position to be held by the stylus bar.

33. The combination with a stylus bar having means for holding a stylus, of a movable guide, a slide carried by said guide and movable with respect thereto, and means for moving the guide toward the stylus bar and then moving the slide with respect to the guide to insert a needle into position to be held by the stylus bar, said means being controlled by a single handle.

34. The combination with a stylus bar having means for holding a stylus, of a movable guide, a slide carried by said guide and movable with respect thereto, and means for moving the guide toward the stylus bar and then moving the slide with respect to the guide to insert a needle into position to be held by the stylus bar, said means comprising a stop for limiting the travel of the guide.

35. The combination with a stylus bar having means for holding the stylus, of a guide, means for holding a stylus in said guide, and means for moving the stylus laterally from the guide into position to be held by the stylus bar.

36. The combination with a stylus bar having means for holding a stylus, of a movable guide, yielding means for holding a stylus in said guide, and a slider carried by said guide and movable with respect thereto for moving the stylus laterally from the guide to the stylus bar.

37. In a talking machine the combination with a movable arm, of a sound box carried thereby and movable with respect thereto, and having a stylus bar provided with means for holding a stylus, and a stylus magazine carried by said arm independent of said sound box.

38. In a talking machine the combination with a movable arm, of a sound box carried thereby and movable with respect thereto, and having a stylus bar provided with means for holding a stylus, a stylus magazine carried by said arm independent of said sound box, and means to move a stylus from said magazine toward said stylus bar.

39. In a talking machine the combination with a movable arm, of a sound box pivoted to said arm and having a stylus bar, a stylus magazine fixed upon said arm, and means to move a stylus from said magazine toward said stylus bar.

40. In a talking machine the combination with a movable arm, of an arm pivoted thereto, a sound box carried by said second mentioned arm, and a stylus magazine fixed with respect to said first mentioned arm.

41. In a talking machine the combination with a movable arm, of an arm pivoted thereto, a sound box carried by said second mentioned arm, a stylus magazine fixed with respect to said first mentioned arm, and means carried by said first mentioned arm for transferring a stylus from said magazine toward said sound box.

42. In a talking machine the combination with an invertible sound box, of stylus changing mechanism located in operative position with respect to said sound box when said sound box is in its inverted position.

43. The combination with a stylus bar, of stylus changing mechanism comprising a stylus magazine, and means for transferring a stylus from said magazine toward said stylus bar, said means comprising a movable guide for a stylus, a member movable in said guide for ejecting a stylus therefrom, a fixed support for said guide, a yielding connection between said guide and said support, and a yielding connection between said guide and said movable member.

44. The combination with a stylus bar, of stylus changing mechanism comprising a stylus magazine, and means for transferring a stylus from said magazine toward said stylus bar, said means comprising a movable guide for a stylus, a member movable in said guide for ejecting a stylus therefrom, a fixed support for said guide, a yielding connection between said guide and said support, a yielding connection between said guide and said movable member, and a stop on said guide to limit the movement thereof.

45. The combination with a stylus bar, of a stylus changing mechanism comprising a stylus guide, a slide movable in said guide, and a spring connected to said guide and normally extending into the path of said slide for holding a stylus opposite the end of said slide.

In testimony whereof I have hereunto set my hand in presence of two subscribing witnesses.

CLARENCE VOGT.

Witnesses:
 WOLDEMAR HAUPT,
 HERMANN RASELOWSKY.